June 11, 1963   E. L. JONES, JR   3,093,180
TRACTION DEVICE FOR AUTOMOBILE WHEELS
Filed Jan. 25, 1962   3 Sheets-Sheet 1

INVENTOR
Edmund L. Jones Jr.

BY Fisher, Christian & Goodson,
ATTORNEYS

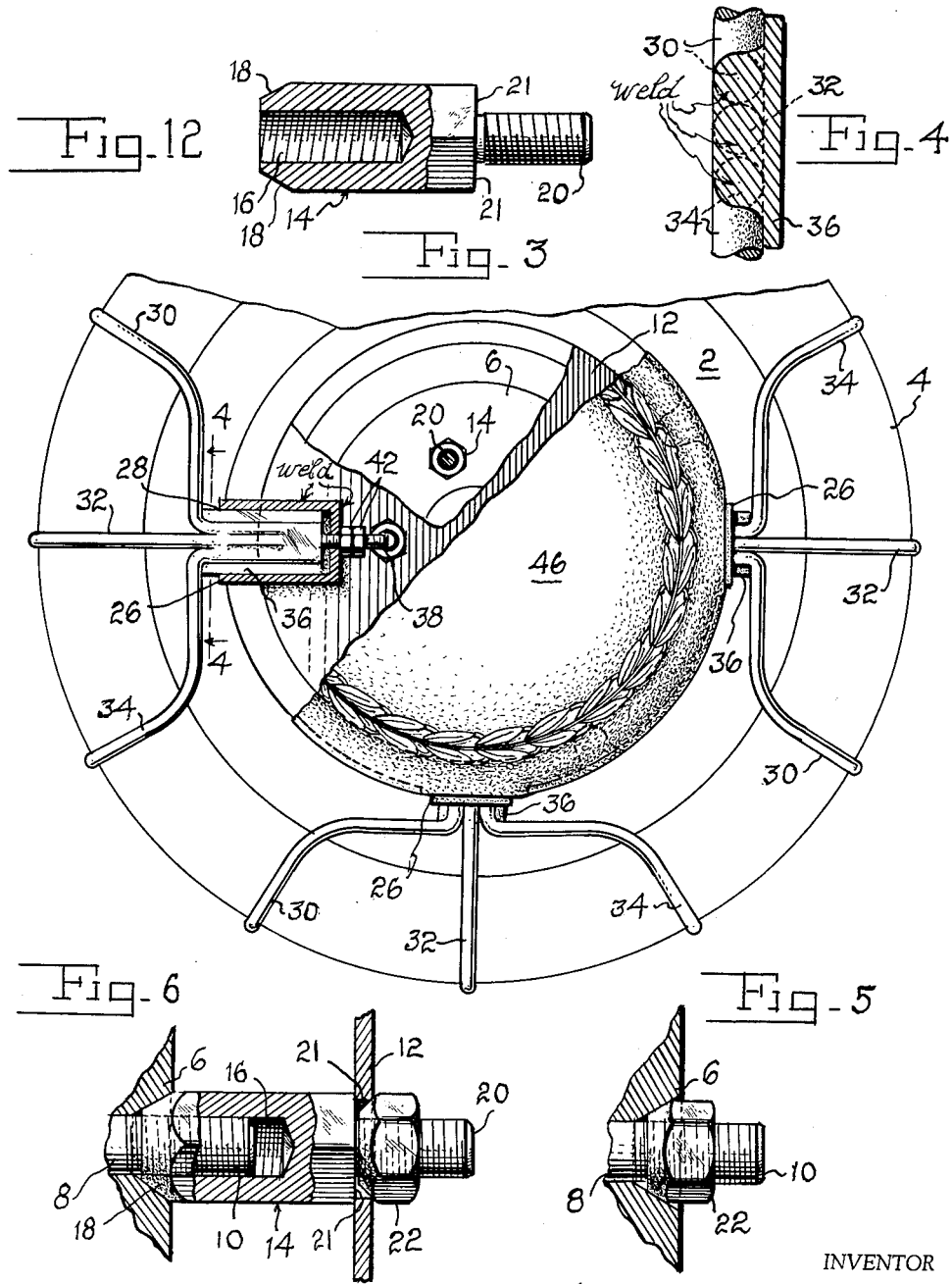

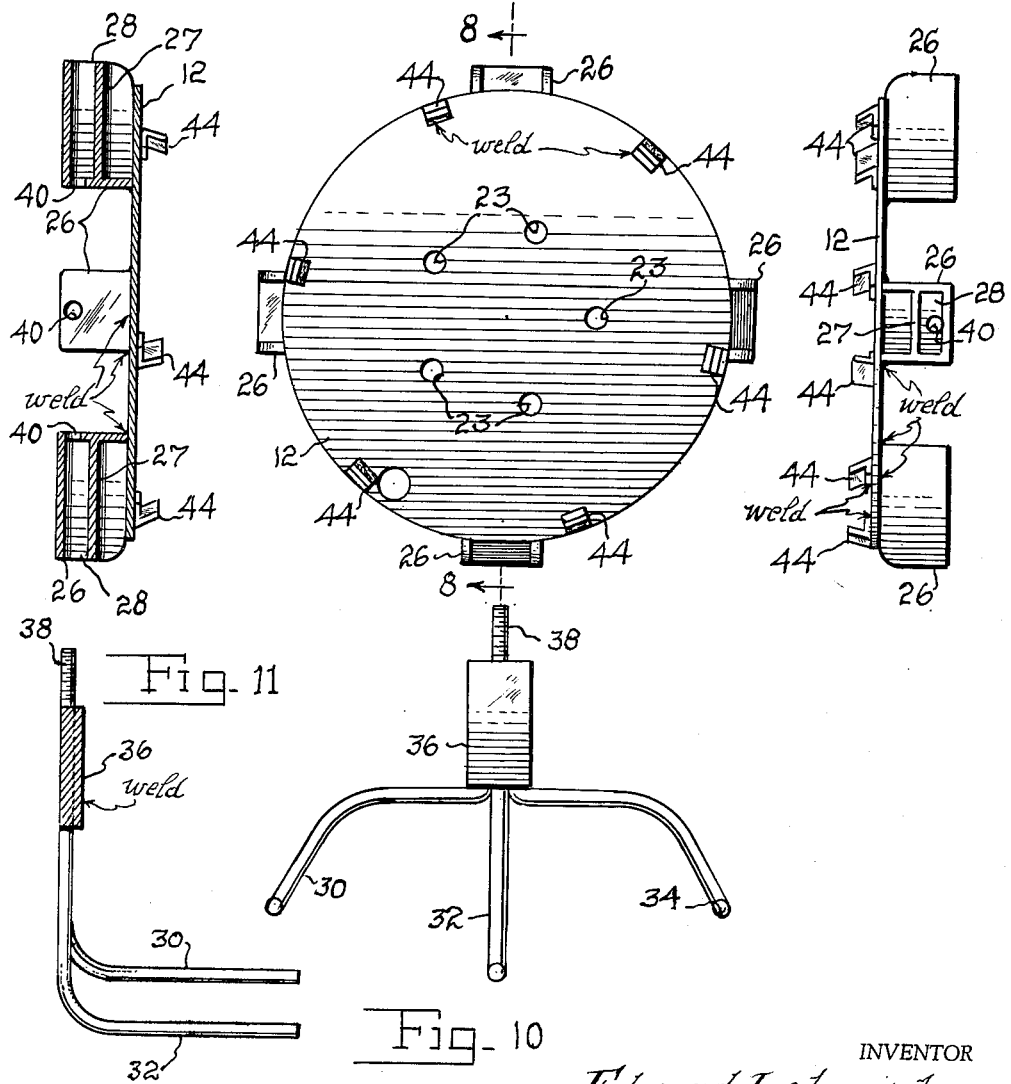

United States Patent Office 3,093,180
Patented June 11, 1963

3,093,180
TRACTION DEVICE FOR AUTOMOBILE WHEELS
Edmund L. Jones, Jr., 1615 Lark Lane, Villanova, Pa.
Filed Jan. 25, 1962, Ser. No. 168,716
4 Claims. (Cl. 152—216)

This invention is an assembly for use with automobile and truck tires, for use on snow-covered or icy streets or slippery streets and roads, and in mud or sand for increasing the traction of the tires. It is intended for use on snow tires as well as on regular tires.

The principal object of the invention is to provide a traction-increasing device which may be readily applied to the tires when needed and readily removed from the tires when not needed, without the necessity of jacking up the wheel. A familiar problem with the suburban motorist is that he needs traction-increasing devices on the tires when in the country, but when he gets into the city, where the main streets are usually cleared, he no longer needs such devices and they should be readily removable to avoid wear and tear both on the tires and on the traction device itself. This invention solves that problem.

Traction-increasing appliances of this sort are subjected to severe mechanical stresses and strains from several directions and must be very strong and rugged. The appliance of the present invention is particularly designed to supply the necessary strength under these conditions.

The traction-increasing device of this invention comprises two important features.

First, a mounting plate that is attached more or less permanently to the wheel. By "permanently" is meant that this mounting plate is bolted in place on the wheels, usually the rear wheels. This plate can remain on the car all the year, but it is usually desirable to put this plate on the wheel at the beginning of winter and to take it off in the spring.

Second, anti-skid or traction-increasing units which can readily be fastened in operative position by securing the traction units to the mounting plate, and also may be readily removed, without jacking up the wheels and with a simple wrench as the only necessary tool.

To describe the invention in more detail, the main mounting plate is mounted on the wheel by removing the nuts, usually five in number, which secure the wheel to the hub. Then spacer elements, interiorly threaded, are threaded onto the exposed stud bolts and tightened firmly in place. The inner ends of these spacers have a conical end for fitting into usual conical recesses on the hub.

With the spacers secured in place, the mounting plate, provided with five holes, is placed on the outer ends of the spacers, which outer ends are threaded, and the same nuts, which have been removed from the wheel, are threaded onto the exposed threaded ends of the spacers and tightened, thereby securing the mounting plate to the wheel.

This mounting plate is provided with a plurality of mounting boxes, conveniently four in number and strongly secured thereto, as by welding.

The ground-engaging traction elements comprise several, preferably three, rods of tough, somewhat resilient, steel, combined in a unit. These three rods, at their inner ends, are welded as a unit to a mounting base, which base is secured in place in one of the mounting boxes; these three rods diverge from each other and their outer ends are formed to fit over the tread of the tire. With four such traction units, each unit having three traction elements, there would be twelve such traction elements, preferably equally spaced around the tire, one every 30°.

The preferred embodiments of this invention will be described in more detail in the accompanying drawings wherein:

FIGURE 3 is a side view, similar to FIGURE 1, showing the mounting boxes in section and a hub cap in place.

FIGURE 4 is an enlarged section on the line 4—4 of FIGURE 3.

FIGURE 5 is an enlarged sectional view before the spacer is in place.

FIGURE 6 is an enlarged sectional view after the spacer is in place.

FIGURE 7 is a side view of the mounting plate.

FIGURE 8 is a sectional view on line 8—8 of FIGURE 7.

FIGURE 9 is an end view of FIGURE 7.

FIGURE 10 is a view of the unit of three traction rods, detached from the mounting plate.

FIGURE 11 is a side view of one of the ground-engaging units.

FIGURE 12 is a sectional view of a spacer bolt.

Figure 1:
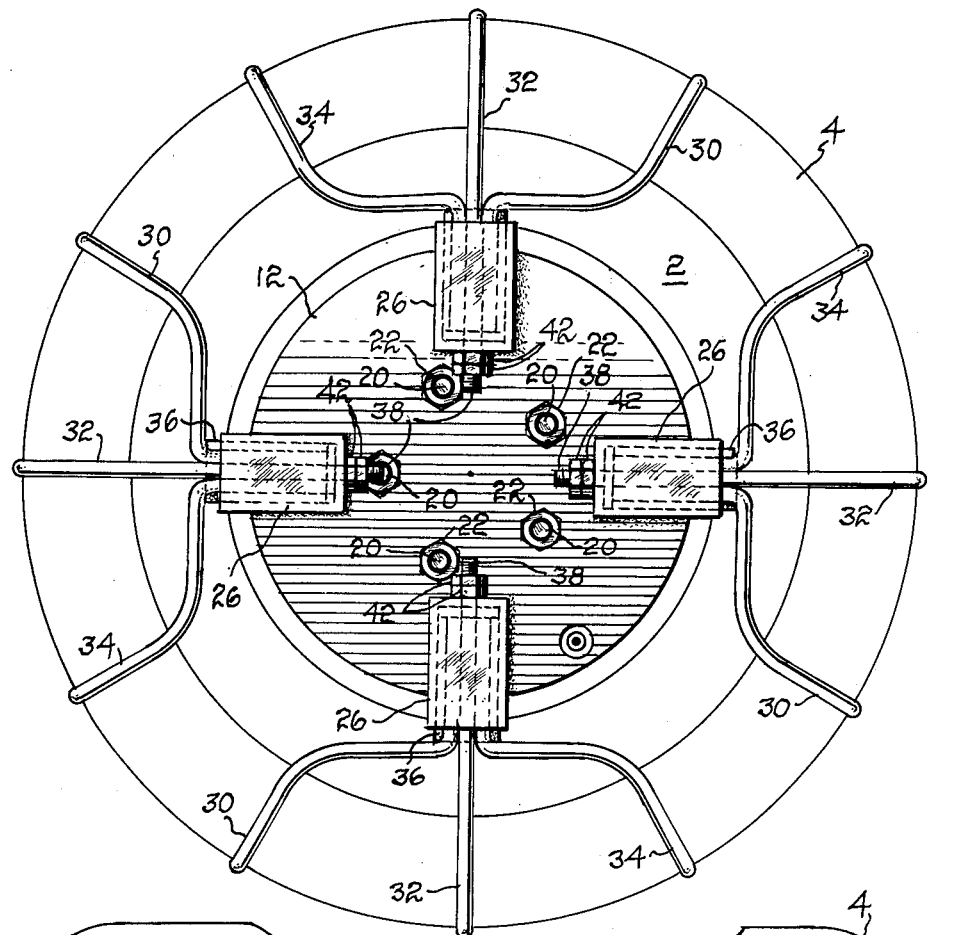
FIGURE 1 is a side view of an automobile wheel with the traction device of the present invention in place thereon.
Figure 2:
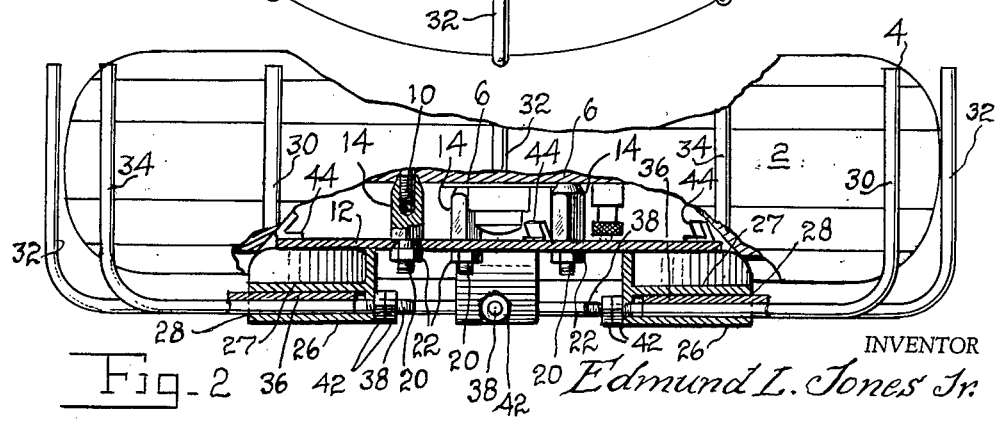
FIGURE 2 is a top plan view of FIGURE 1, parts being broken away and shown in section.

Referring now to these drawings, a conventional automobile wheel 2 is provided with the usual tire 4 and the usual hub plate, a portion of which is shown at 6. The hub plate has projecting therefrom the usual mounting bolts 8, exteriorly threaded at 10, on which is threaded the usual nut.

The mounting plate 12, which is an important feature of the invention is fairly heavy and is secured to, but spaced away from the hub plate 6. To mount the plate 12 spaced from the hub, spacer bolts 14 are used. Referring particularly to FIGURES 5, 6 and 12, each spacer 14 is interiorly threaded at 16 and has its inner end of frustro-conical shape, as at 18, to fit the usual corresponding conical recess in the hub plate 6, the threads 16 being of proper pitch to fit the threads 10 of bolts 8.

The outer end of each spacer 14 is exteriorly threaded as at 20, the threaded portion being reduced to provide a shoulder 21 on the spacer. The threads 20 are of proper pitch to cooperate with threaded nuts 22, which nuts, normally on the hub, are the same nuts that are used to bolt the hub 6 to the axle of the car. The nuts 22 are of the usual frusto-conical shape.

To summarize the operation up to this point: In order to mount the mounting plate 12, the hub cap is removed, the usual nuts 22 on the hub are removed, a spacer 14 is threaded onto the end 10 of each bolt 8 and tightened into place, the exterior surface of the spacers preferably being hexagonal in shape for the wrench. Then the mounting plate 12, provided with holes 23 registering with the ends 20 of the spacers, is put in place on the spacers 14, the plate 12 resting against the shoulders 21 on the spacers and then held there by tightening nuts 22. Such mounting of the plate 12 could be considered more or less permanent, in that the plate could be applied to and remain on the car for the winter, or as long as desired.

The periphery of mounting plate 12 is provided with a number of outwardly opening boxes 26, conveniently four in number, welded in place. These boxes are rectangular in shape and include a central strengthening partition 27, defining with the walls of the box, an outwardly facing opening 28, this opening 28 being to receive and mount the traction members, now to be described.

The traction members preferably comprise three rods 30, 32 and 34 of strong, tough steel, which converge as shown, the inner ends of these members being brought into parallelism as shown at the left of FIGURE 3 and FIGURE 4 and welded to each other and welded to a base plate 36. Base plate 36 with the three rods welded thereto fit snugly into, as a unit, one of the mounting boxes 26, fitting into opening 28 in its respective box. The center rod 32 is extended and threaded at its inner end, as at 38, this threaded end extending through the hole 40 in the back wall of box 26. One or two lock nuts 42 are threaded onto threaded end 38. The mounting of the inner ends of the rods on base plate 36, secured in boxes 26 against lateral displacement and secured by nuts 42 against longitudinal displacement, provide a very strong and rugged assembly.

The traction elements 30, 32 and 34 extend over the tire tread. Their outer portions are preferably substantially straight as in FIGURE 11, so as to be in close contact with the tire, where it is slightly flattened where it contacts the ground.

The main mounting plate 12 is normally in place on the car and held there more or less permanently by nuts 22, while the four traction units 30, 32 and 34 would be carried in the trunk of the car. In the event of snow or ice, the several units 30, 32 and 34 are mounted in the respective mounting boxes 26, the lock nuts 42 tightened to draw the traction elements snugly against the tire. The mounting boxes 26 are strong and heavy and the rods or grippers 30, 32 and 34 with their ends welded to each other and to their base plates 36 are securely held in these boxes against lateral displacement and also securely held by the lock nuts 42. The traction units are readily removable when no longer needed, by using an ordinary wrench to remove the lock nuts 42, and replaced in the trunk of the car, the main mounting plate remaining in place on the hub.

The mounting plate 12, on that side toward the wheel, is provided with inwardly and angularly projecting lugs 44 which bear against the rim of the wheel to provide a firm and steady support for plate 12 and to relieve any stresses on the spacer bolts 14. The usual hub cap is shown at 46, FIG. 3.

While the preferred embodiment of the invention has been described in detail, it should be understood that the invention is not limited to these details, but may be carried out in other ways.

I claim as my invention:

1. A traction device for automobile wheels, comprising spacer members having their inner ends interiorly threaded and their outer ends exteriorly threaded, the interiorly threaded ends of said spacer members being adapted to engage with the usual stud bolts carried by the hub of an automobile wheel, a mounting plate carried by the outer ends of said spacer members, nuts engageable with the exteriorly-threaded ends of said spacer members and with the mounting plate, for holding the mounting plate on said spacer members, outwardly opening mounting boxes carried near the periphery of said mounting plate, a plurality of base plates, a plurality of groups of ground engaging traction members having their inner portions converged toward each other and secured to its respective base plate, the several base plates being mounted respectively in said mounting boxes.

2. The combination of claim 1, wherein the inner ends of the several groups of said ground engaging members are juxtaposed and welded to their respective base plates.

3. The combination of claim 1, wherein the inner ends of the several groups of said ground engaging members are juxtaposed and welded to its respective base plate and wherein the several base plates are detachably secured in their respective mounting boxes.

4. A traction device for automobile wheels, comprising spacer members, having their inner ends interiorly threaded and their outer ends exteriorly threaded, the inner ends of said spacer members adapted to engage with the usual stud bolts carried by the hub of an automobile wheel, a mounting plate carried by the outer ends of said spacer members, nuts engageable with the outer ends of said spacer members and with the mounting plate for holding the mounting plate on said spacer members, outwardly opening, substantially rectangular, mounting boxes, secured at spaced intervals around the periphery of said mounting plate, and ground engaging traction members, and nut and bolt means cooperating with the inner ends of said traction members and with the inner ends of the respective mounting boxes, for detachably mounting the traction members in said mounting boxes.

References Cited in the file of this patent

UNITED STATES PATENTS

| 2,598,851 | Spevak | June 3, 1952 |
| 2,986,190 | Lamb | May 30, 1961 |
| 2,990,868 | Steele | July 4, 1961 |

FOREIGN PATENTS

| 813,291 | France | Feb. 22, 1937 |